United States Patent
Jeong

(10) Patent No.: US 12,487,768 B2
(45) Date of Patent: Dec. 2, 2025

(54) STORAGE DEVICE MANAGING METADATA MEMORY BLOCKS EACH STORING METADATA UNITS, AND METHOD OF OPERATING THE SAME

(71) Applicant: SK hynix Inc., Icheon (KR)

(72) Inventor: Cheon Ok Jeong, Icheon (KR)

(73) Assignee: SK hynix Inc., Icheon (KR)

( * ) Notice: Subject to any disclaimer, the term of this patent is extended or adjusted under 35 U.S.C. 154(b) by 141 days.

(21) Appl. No.: 18/169,120

(22) Filed: Feb. 14, 2023

(65) Prior Publication Data
US 2024/0143216 A1    May 2, 2024

(30) Foreign Application Priority Data
Oct. 26, 2022    (KR) .................. 10-2022-0139359

(51) Int. Cl.
*G06F 3/06* (2006.01)
(52) U.S. Cl.
CPC .......... *G06F 3/0652* (2013.01); *G06F 3/0604* (2013.01); *G06F 3/0673* (2013.01)

(58) Field of Classification Search
CPC .... G06F 3/0604; G06F 3/0652; G06F 3/0673; G06F 3/0679
See application file for complete search history.

(56) References Cited

U.S. PATENT DOCUMENTS

| | | | |
|---|---|---|---|
| 2013/0212320 A1 | 8/2013 | Lee et al. | |
| 2014/0181432 A1* | 6/2014 | Horn | G06F 12/0253 711/159 |
| 2019/0391916 A1* | 12/2019 | Hsieh | G06F 12/0292 |
| 2020/0042243 A1* | 2/2020 | Lee | G06F 3/064 |
| 2020/0042460 A1* | 2/2020 | Oh | G06F 12/0246 |

FOREIGN PATENT DOCUMENTS

KR    1020190076256 A    7/2019

* cited by examiner

*Primary Examiner* — Jane W Benner

(57) ABSTRACT

A storage device may execute an erase operation on a first metadata memory block. The storage device may copy, to the first metadata memory block, all or some of metadata units stored in a second metadata memory block that is a metadata memory block on which the erase operation is to be executed after the erase operation is executed on the first metadata memory block.

7 Claims, 13 Drawing Sheets

STORAGE DEVICE MANAGING METADATA MEMORY BLOCKS EACH STORING METADATA UNITS, AND METHOD OF OPERATING THE SAME

CROSS-REFERENCE TO RELATED APPLICATION

The present application claims priority under 35 U.S.C. § 119(a) to Korean Patent Application No. 10-2022-0139359 filed on Oct. 26, 2022, which is incorporated herein by reference in its entirety.

BACKGROUND

1. Technical Field

Various embodiments generally relate to a storage device which manages metadata memory blocks each storing metadata units, and a method of operating the storage device.

2. Related Art

A storage device is a device which stores data on the basis of a request of a host such as a computer, a mobile terminal such as a smartphone or a tablet, or any of various electronic devices.

The storage device may include a controller for controlling a memory (e.g., volatile memory or nonvolatile memory). The controller may receive a command from the host, and may execute or control an operation for reading, writing, or erasing data with respect to the memory included in the storage device, in response to the received command.

The storage device may use metadata to manage user data stored in the memory. The storage device may store the metadata in the memory.

SUMMARY

Various embodiments are directed to a storage device capable of ensuring high reliability of stored data by determining storage priorities of metadata depending on importance of the metadata, and a method of operating the storage device.

In an embodiment, a storage device may include: i) a memory including a plurality of metadata memory blocks, each metadata memory block storing a plurality of metadata units; and ii) a controller configured to execute an erase operation on a first metadata memory block, and copy, to the first metadata memory block, all or a some of metadata units stored in a second metadata memory block that is a metadata memory block on which the erase operation is to be executed after the erase operation is executed on the first metadata memory block, the first and the second metadata memory blocks being included in the plurality of metadata memory blocks.

In an embodiment, a method of operating a storage device may include: i) executing an erase operation on a first metadata memory block among a plurality of metadata memory blocks each capable of storing a plurality of metadata units; ii) determining a second metadata memory block on which the erase operation is to be executed after the erase operation is executed on the first metadata memory block; iii) determining target metadata units to be copied to the first metadata memory block among metadata units stored in the second metadata memory block; and iv) copying the target metadata units to the first metadata memory block.

In an embodiment, a controller may include: i) a memory interface capable of communicating with a memory that includes a plurality of metadata memory blocks each capable of storing a plurality of metadata units; and ii) a control circuit configured to copy target metadata units stored in a first metadata memory block on which an erase operation is to be executed among the plurality of metadata memory blocks, to a second metadata memory block in which a free space exists, the first and the second metadata memory blocks being included in the plurality of metadata memory blocks.

According to the embodiments of the disclosed technology, it is possible to ensure high reliability of stored data by determining storage priorities of metadata depending on importance of the metadata.

DETAILED DESCRIPTION

Figure 1:
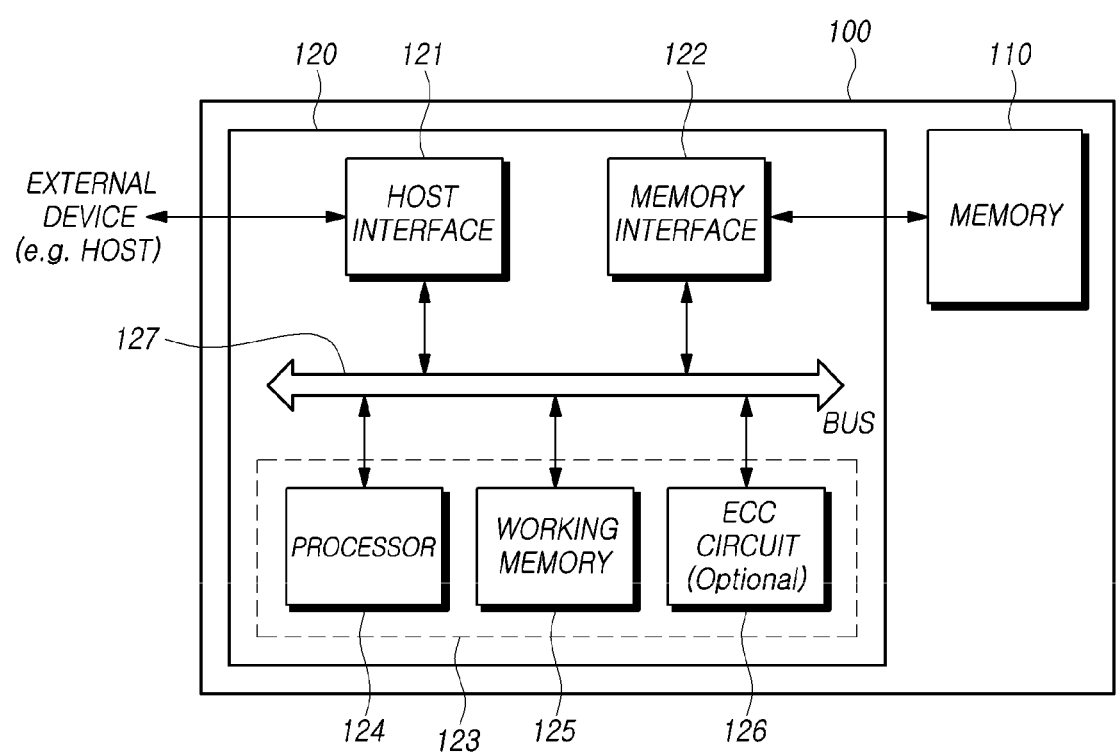
FIG. 1 illustrates a storage device according to an embodiment of the disclosed technology.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 illustrates a storage device 100 according to an embodiment of the disclosed technology.

Referring to FIG. 1, the storage device 100 may include a memory 110 which stores data, and a controller 120 which controls the memory 110.

The memory 110 includes a plurality of memory blocks, and operates under the control of the controller 120. Operations of the memory 110 may include a read operation, a program operation (also referred to as "write operation"), and an erase operation.

The memory 110 may include a memory cell array including a plurality of memory cells (also simply referred to as "cells") which store data. Such a memory cell array may exist in a memory block.

For example, the memory 110 may be implemented into any of various types such as a NAND flash memory, a 3D NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like.

The memory 110 may be implemented as a three-dimensional array structure. The embodiment of the disclosed technology may be applied to not only a flash memory in which a charge storage layer is configured by a conductive floating gate but also a charge trap flash (CTF) in which a charge storage layer is configured by a dielectric layer.

The memory 110 may receive a command and an address from the controller 120 and may access an area which is selected by the address in the memory cell array. In other words, the memory 110 may perform an operation indicated by the command, on the area selected by the address.

For example, the memory 110 may perform a program operation, a read operation, and an erase operation. In this connection, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (or program), read, erase, and background operations for the memory 110. For example, the background operation may include at least one among a garbage collection (GC) operation, a wear leveling (WL) operation, a read reclaim (RR) operation, a bad block management (BBM) operation, and so forth.

The controller 120 may control the operation of the memory 110 according to a request from an external device (e.g., host) located outside the storage device 100. On the other hand, the controller 120 may control the operation of the memory 110 regardless of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, a mobility device (e.g., a vehicle, a robot or a drone) capable of traveling under human control or autonomous driving, etc.

The host may include at least one operating system (OS). The operating system may generally manage and control the function and operation of the host, and may provide interoperability between the host and the storage device 100. The operating system may be classified into a general operating system and a mobile operating system depending on the mobility of the host.

The controller 120 and the host may be separated from each other. The controller 120 and the host may be integrated into one device. Hereunder, for the sake of convenience in explanation, it will be described as an example that the controller 120 and the host are separated from each other.

Referring to FIG. 1, the controller 120 may include a memory interface 122, a control circuit 123, and a host interface 121.

The host interface 121 provides an interface for communication with the host. For example, the host interface 121 provides an interface which uses at least one among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an SMBus (system management bus) protocol, an I2C (inter-integrated circuit) protocol, an I3C (improved inter-integrated circuit) protocol, an IDE (integrated drive electronics) protocol, and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 under the control of the control circuit 123.

The control circuit 123 performs the general control operation of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate the logical block address (LBA) into the physical block address (PBA) by using a mapping table.

There are various address mapping methods of the flash translation layer, depending on a mapping unit. Representative address mapping methods include a page mapping method, a block mapping method, and a hybrid mapping method.

The processor 124 may randomize data received from the host. For example, the processor 124 may randomize data received from the host by using a set randomizing seed. The randomized data may be provided to the memory 110, and may be programmed to the memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 to be described based on the embodiment of the disclosed technology may be implemented in such a way that the processor 124 executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one among a flash translation layer (FTL) which performs a translating function between a logical address requested to the storage device 100 from the host and a physical address of the memory 110, a host interface layer (HIL) which serves to analyze a command requested to the storage device 100 as a storage device from the host and transfer the command to the flash translation layer (FTL), and a flash interface layer (FIL) which transfers a command, instructed from the flash translation layer (FTL), to the memory 110.

Such firmware may be loaded in the working memory 125 from, for example, the memory 110 or a separate nonvolatile memory (e.g., ROM or NOR Flash) located outside the memory 110. The processor 124 may first load all or a part of the firmware in the working memory 125 when executing a booting operation after power-on.

The processor 124 may perform a logic calculation which is defined in the firmware loaded in the working memory 125, to control the general operation of the controller 120. The processor 124 may store a result of performing the logic calculation defined in the firmware, in the working memory 125. The processor 124 may control the controller 120 according to the result of performing the logic calculation defined in the firmware such that the controller 120 generates a command or a signal. When a part of firmware in which the logic calculation to be performed is defined is stored in the memory 110 but has not been loaded in the working memory 125, the processor 124 may generate an event (e.g., interrupt) for loading the corresponding part of the firmware into the working memory 125 from the memory 110.

The processor 124 may load metadata necessary for driving firmware, from the memory 110. The metadata, as data for managing the memory 110, may include management information on user data stored in the memory 110.

Firmware may be updated while the storage device 100 is manufactured or while the storage device 100 is executed. The controller 120 may download new firmware from the outside of the storage device 100 and update existing firmware with the new firmware.

The working memory 125 may store firmware, a program code, a command, and data which are necessary to drive the controller 120. Such a working memory 125 may include at least one among an SRAM (static RAM), a DRAM (dynamic RAM), and an SDRAM (synchronous DRAM).

The error detection and correction circuit 126 may detect an error bit of target data and correct the detected error bit by using an error correction code. The target data may be data stored in the working memory 125 or data read from the memory 110.

The error detection and correction circuit 126 may be implemented to decode data by using an error correction code. The error detection and correction circuit 126 may be implemented by various code decoders. For example, a decoder which performs unsystematic code decoding or a decoder which performs systematic code decoding may be used as the error detection and correction circuit 126.

For example, the error detection and correction circuit 126 may detect an error bit by the unit of sectors in each of read data. Namely, each read data may be divided into a plurality of sectors. A sector may be a data unit smaller than a page that is the read unit of a flash memory. The plurality of sectors constituting each read data may 1o be matched with one another based on an address.

The error detection and correction circuit 126 may calculate a bit error rate (BER), and may determine whether an error bit is correctable or not, in the unit of sectors. For example, when a bit error rate (BER) is higher than a set reference value, the error detection and correction circuit 126 may determine that a corresponding sector is uncorrectable or failed. On the other hand, when the bit error rate (BER) is lower than the set reference value, the error detection and correction circuit 126 may determine that the corresponding sector is correctable or passed.

The error detection and correction circuit 126 may perform an error detection and correction operation sequentially for all read data. In the case where a sector included in read data is correctable, the error detection and correction circuit 126 may omit an error detection and correction operation for a corresponding sector of next read data. When the error detection and correction operation for all read data is ended in this way, the error detection and correction circuit 126 may detect a sector which is determined to be uncorrectable to the last. There may be one or more sectors that are determined to be uncorrectable. The error detection and correction circuit 126 may transfer information (for example, address information) on the sector which is determined to be uncorrectable, to the processor 124.

A bus 127 may be configured to provide channels among the components 121, 122, 124, 125, and 126 of the controller 120. The 1o bus 127 may include a control bus for transferring various control signals, commands, and the like, a data bus for transferring various data, and so forth.

Some components among the above-described components 121, 122, 124, 125, and 126 of the controller 120 may be omitted, or some components among the above-described components 121, 122, 124, 125, and 126 of the controller 120 may be integrated into one component. In addition to the above-described components 121, 122, 124, 125, and 126 of the controller 120, one or more other components may be added to the controller 120.

Hereinbelow, the memory 110 will be described in further detail with reference to FIG. 2.

Figure 2:
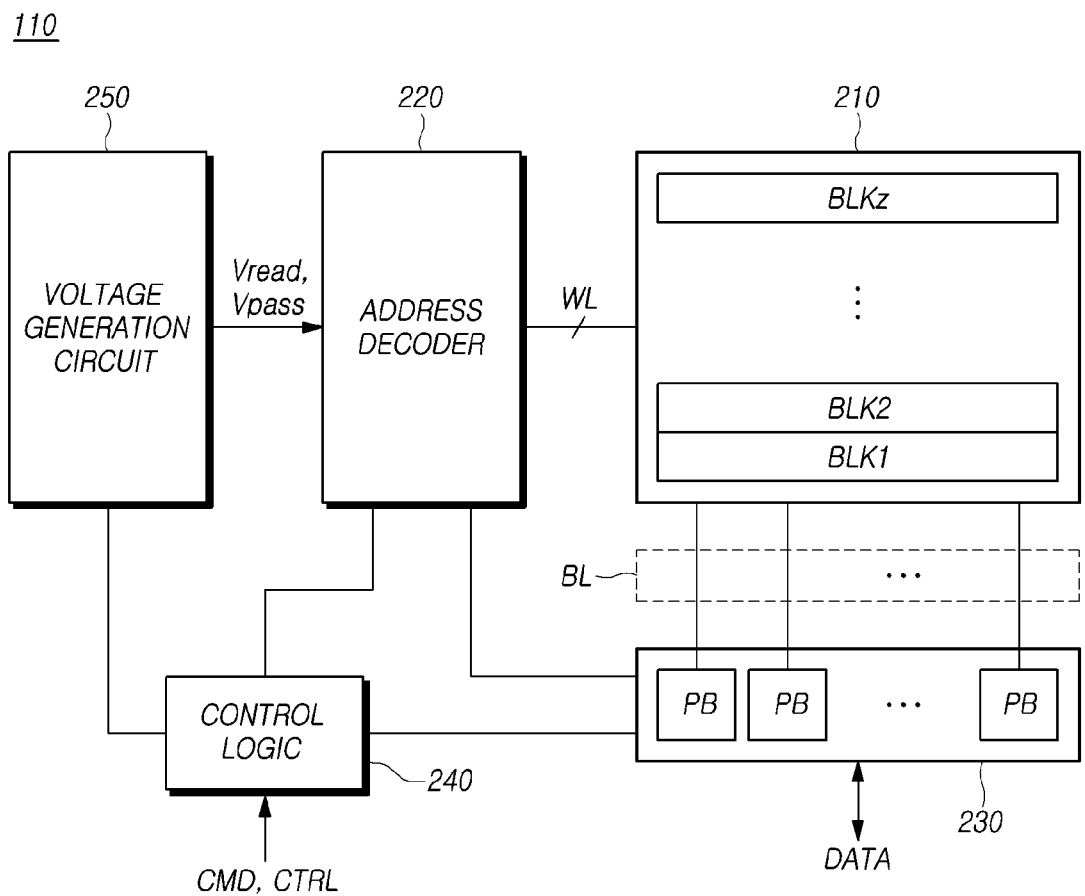
FIG. 2 illustrates a memory of FIG. 1.

FIG. 2 illustrates the memory 110 of FIG. 1.

Referring to FIG. 2, the memory 110 may include a memory cell array 210, an address decoder 220, a read and write circuit 230, a control logic 240, and a voltage generation circuit 250.

The memory cell array 210 may include a plurality of memory blocks BLK1 to BLKz (z is a natural number of 2 or greater).

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and the nonvolatile memory cells may have vertical channel structures.

The memory cell array 210 may have a two-dimensional structure or a three-dimensional structure.

Each of the plurality of memory cells included in the memory cell array 210 may store at least 1-bit data. For instance, each of the plurality of memory cells included in the memory cell array 210 may be a signal-level cell (SLC) which stores 1-bit data. For another instance, each of the plurality of memory cells included in the memory cell array 210 may be a multi-level cell (MLC) which stores 2-bit data. For still another instance, each of the plurality of memory cells included in the memory cell array 210 may be a triple-level cell (TLC) which stores 3-bit data. For yet another instance, each of the plurality of memory cells included in the memory cell array 210 may be a quad-level cell (QLC) which stores 4-bit data. For still yet another instance, the memory cell array 210 may include a plurality of memory cells, each of which stores 5 or more-bit data.

The number of bits of data stored in each of the plurality of memory cells may be dynamically determined. For example, a single-level cell which stores 1-bit data may be changed to a triple-level cell which stores 3-bit data.

Referring to FIG. 2, the address decoder 220, the read and write circuit 230, the control logic 240, and the voltage generation circuit 250 may operate as a peripheral circuit which drives the memory cell array 210.

The address decoder 220 may be coupled to the memory cell array 210 through the plurality of word lines WL.

The address decoder 220 may be configured to operate under the control of the control logic 240.

The address decoder 220 may receive an address through an input/output buffer in the memory 110. The address decoder 220 may be configured to decode a block address in the received address. The address decoder 220 may select at least one memory block based on the decoded block address.

The address decoder 220 may receive a read voltage Vread and a pass voltage Vpass from the voltage generation circuit 250.

The address decoder 220 may apply the read voltage Vread to a selected word line WL in a selected memory block in a read voltage applying operation during a read operation, and may apply the pass voltage Vpass to the remaining unselected word lines WL.

The address decoder 220 may apply a verify voltage generated in the voltage generation circuit 250 to the selected word line WL in the selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed in the unit of pages. An address received when the read operation or the program operation is requested may include at least one among a block address, a row address, and a column address.

The address decoder 220 may select one memory block and one word line based on a block address and a row address. A column address may be decoded by the address decoder 220 and be provided to the read and write circuit 230.

The address decoder 220 may include at least one among a block decoder, a row decoder, a column decoder, and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit. The read and write circuit 230 may include data buffers which perform a data processing function, and may further include cache buffers which perform a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, amounts of current that flow through the bit lines BL and depend on programmed states of the memory cells.

The read and write circuit 230 may operate in response to page buffer control signals outputted from the control logic 240.

In a read operation, the read and write circuit 230 temporarily stores read data DATA by sensing data of memory cells, and then, outputs the read data to the input/output buffer of the memory 110. In an embodiment, the read and write circuit 230 may include a column selection circuit in addition to the page buffers PB or the page registers.

The control logic 240 may be coupled with the address decoder 220, the read and write circuit 230, and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in the read operation, in response to a voltage generation circuit control signal outputted from the control logic 240.

Each memory block of the memory 110 described above may include a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be arranged in a row direction, and each of the plurality of bit lines BL may be arranged in a column direction. For another example, each of the plurality of word lines WL may be arranged in the column direction, and each of the plurality of bit lines BL may be arranged in the row direction.

Each memory cell in the memory block BLK may be coupled to one of the plurality of word lines WL and one of the plurality of bit lines BL. The memory cell may include a transistor.

For example, a transistor disposed in each memory cell (MC) may include a drain, a source, and a gate. The drain (or source) of the transistor may be coupled to a corresponding bit line BL directly or via another transistor. The source (or drain) of the transistor may be coupled to a source line (which may be grounded) directly or via another transistor. The gate of the transistor may include a floating gate and a control gate. The floating gate may be surrounded by a dielectric, and a gate voltage may be applied to the control gate from a corresponding word line WL.

In each memory block, a first selection line (also referred to as a source selection line or a drain selection line) may be additionally disposed outside a first outermost word line closer to the read and write circuit 230 between two outermost word lines, and a second selection line (also referred to as a drain selection line or a source selection line) may be additionally disposed outside a second outermost word line between the two outermost word lines.

In an embodiment, at least one dummy word line may be additionally disposed between the first outermost word line and the first selection line. At least one dummy word line may also be additionally disposed between the second outermost word line and the second selection line.

A read operation and a program operation (or write operation) of the memory block described above may be performed by the unit of pages, and an erase operation thereof may be performed by the unit of memory blocks.

Figure 3:
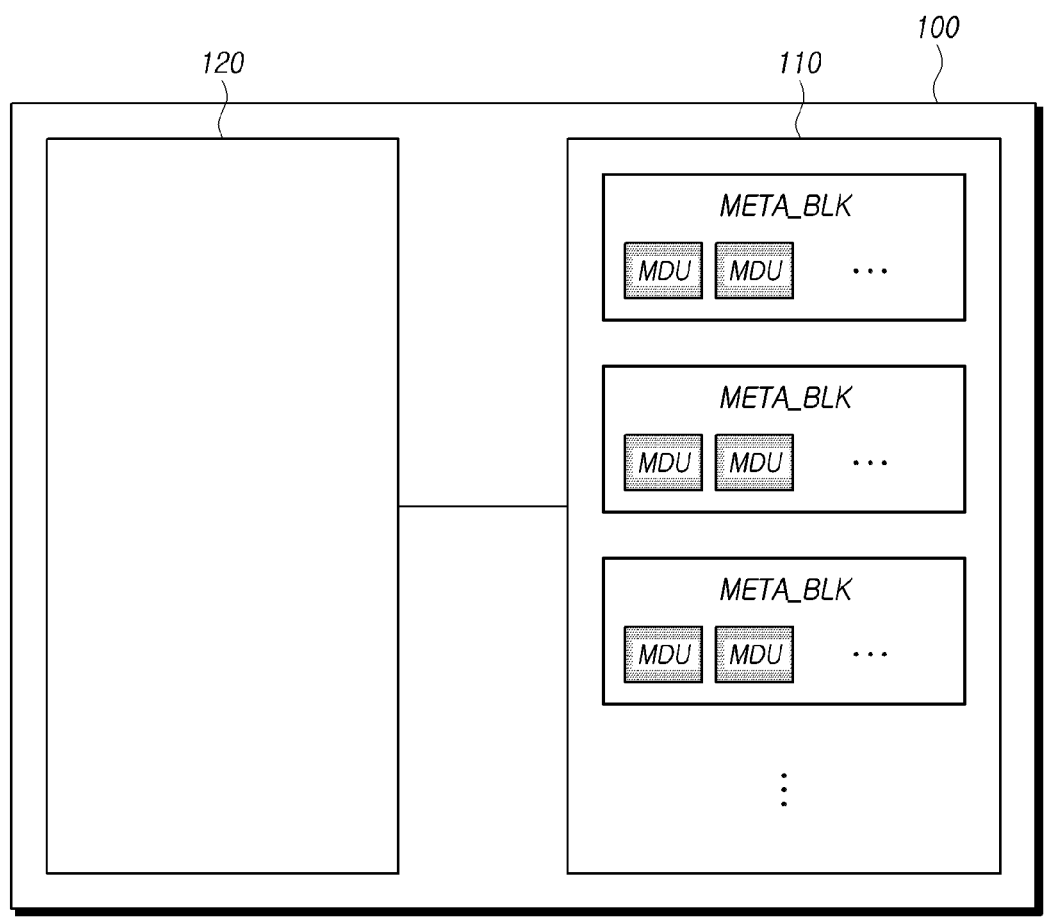
FIG. 3 illustrates a storage device according to an embodiment of the disclosed technology.

FIG. 3 illustrates a storage device 100 according to an embodiment of the disclosed technology.

Referring to FIG. 3, the storage device 100 may include a memory 110 and a controller 120.

The memory 110 may include a plurality of metadata memory blocks META_BLK. Each of the plurality of metadata memory blocks META_BLK may store a plurality of metadata units MDU. The metadata unit MDU is a unit by which metadata is stored in the metadata memory block META_BLK. For example, the size of the metadata unit MDU may correspond to the size of a page or the size of multiple pages.

Each of the metadata memory blocks META_BLK may correspond to the memory block described above with reference to FIG. 1 or a super memory block including one or more memory blocks.

The controller 120 may perform an operation of managing the plurality of metadata memory blocks META_BLK. The controller 120 may read metadata units MDU from the plurality of metadata memory blocks META_BLK included in the memory 110 or may write metadata units MDU to the plurality of metadata memory blocks META_BLK included in the memory 110. The controller 120 may erase one of the plurality of metadata memory blocks META_BLK.

First, a detailed example of metadata units MDU stored in the plurality of metadata memory blocks META_BLK will be described.

Figure 4:
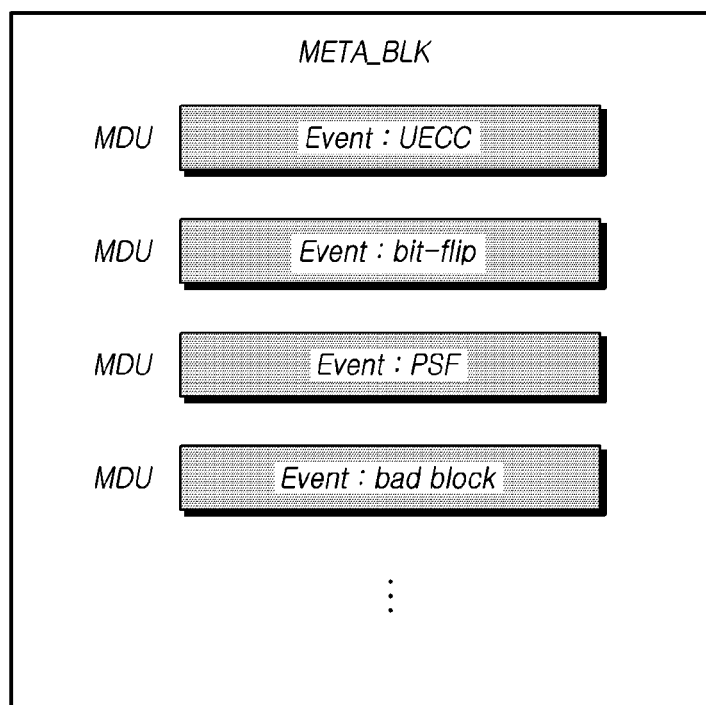
FIG. 4 illustrates metadata units according to an embodiment of the disclosed technology.

FIG. 4 illustrates metadata units MDU according to an embodiment of the disclosed technology.

Referring to FIG. 4, the metadata units MDU may include information indicating one or more events occurred in the storage device 100.

When one or more specific events have occurred while the storage device 100 operates, the storage device 100 may generate metadata units MDU including information indicating the one or more specific events to record that the one or more specific events have occurred.

The storage device 100 may know which events have previously occurred in the storage device 100 by referring to the metadata units MDU stored in a metadata memory block META_BLK.

For example, a metadata unit MDU indicating that an uncorrectable ECC (UECC) has occurred, a metadata unit MDU indicating that a bit-flip has occurred, a metadata unit MDU indicating that a program status fail (PSF) has occurred, and a metadata unit MDU indicating that a bad block has occurred may be stored in the metadata memory block META_BLK.

FIG. 4 illustrates one metadata unit MDU that indicates one event, but one metadata unit MDU may indicate a plurality of events. For example, one metadata unit MDU may indicate that the UECC and the PSF have occurred.

The metadata unit MDU may further include additional information on an event occurred in the storage device 100. For example, the metadata unit MDU indicating that the uncorrectable ECC (UECC) has occurred may include information on an address corresponding to a location where the UECC has occurred.

Types of events which may be recorded using metadata units MDU are not limited to the examples described above with reference to FIG. 4. The storage device 100 may generate metadata units MDU to record that various types of events (e.g., booting end and open block generation) have occurred therein.

As described above, the metadata unit MDU may be stored in the metadata memory block META_BLK. Hereinafter, how the storage device 100 manages metadata memory blocks META_BLK to store metadata units MDU will be described.

The storage device 100 may store metadata units MDU in the plurality of metadata memory blocks META_BLK. However, there is a limitation in the storage capacity of the plurality of metadata memory blocks META_BLK. Further, as the number of events occurred in the storage device 100 increases, the number of newly generated metadata units MDU also increases.

Accordingly, in order to secure, in the plurality of metadata memory blocks META_BLK, a space in which newly generated metadata units MDU are to be stored, the storage device 100 needs to erase some of metadata units MDU previously stored in the plurality of metadata memory blocks META_BLK. This will be described below with reference to FIGS. 5 and 6.

Figure 5:
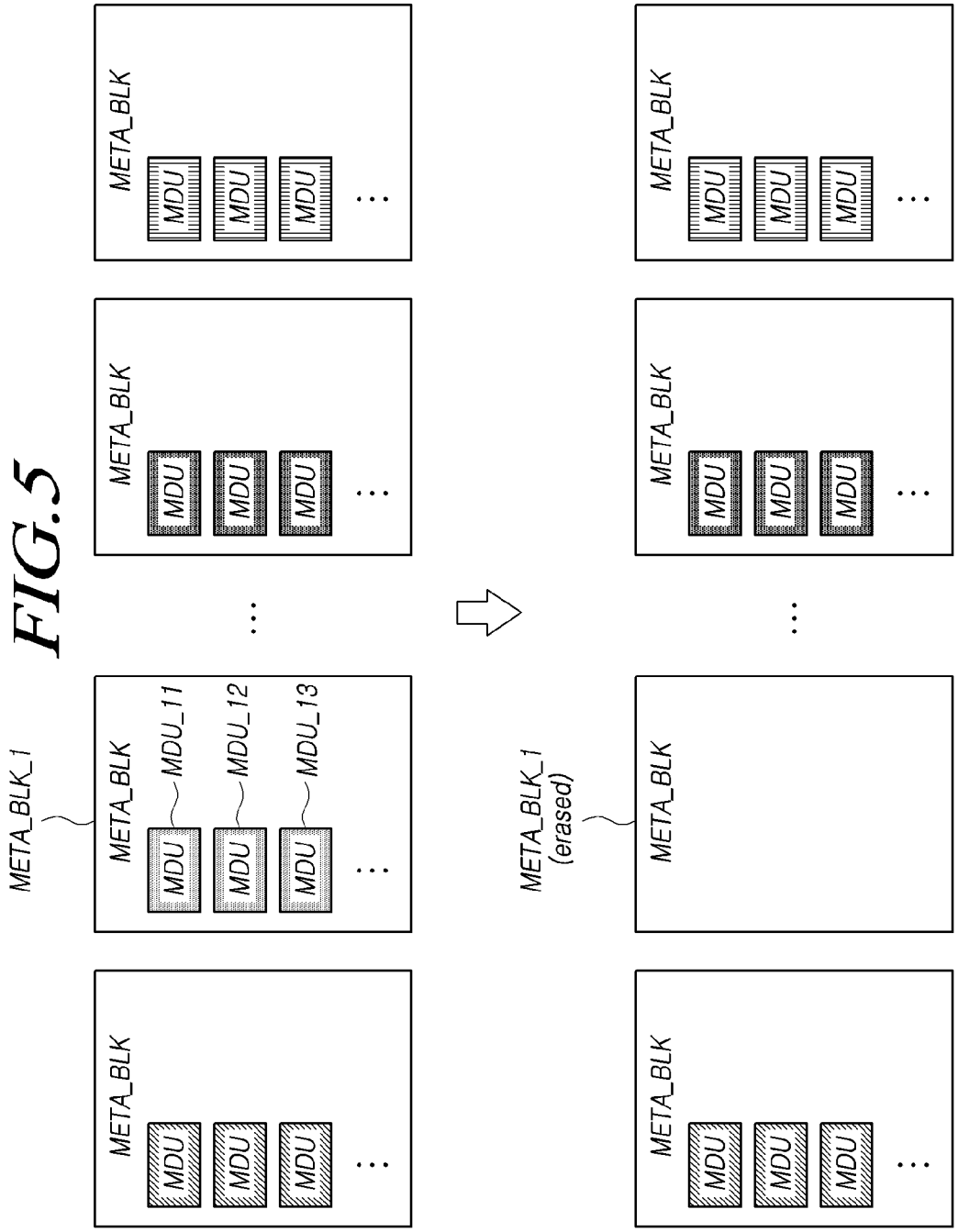
FIGS. 5 and 6 illustrate an operation of managing a plurality of metadata memory blocks according to an embodiment of the disclosed technology.
Figure 6:
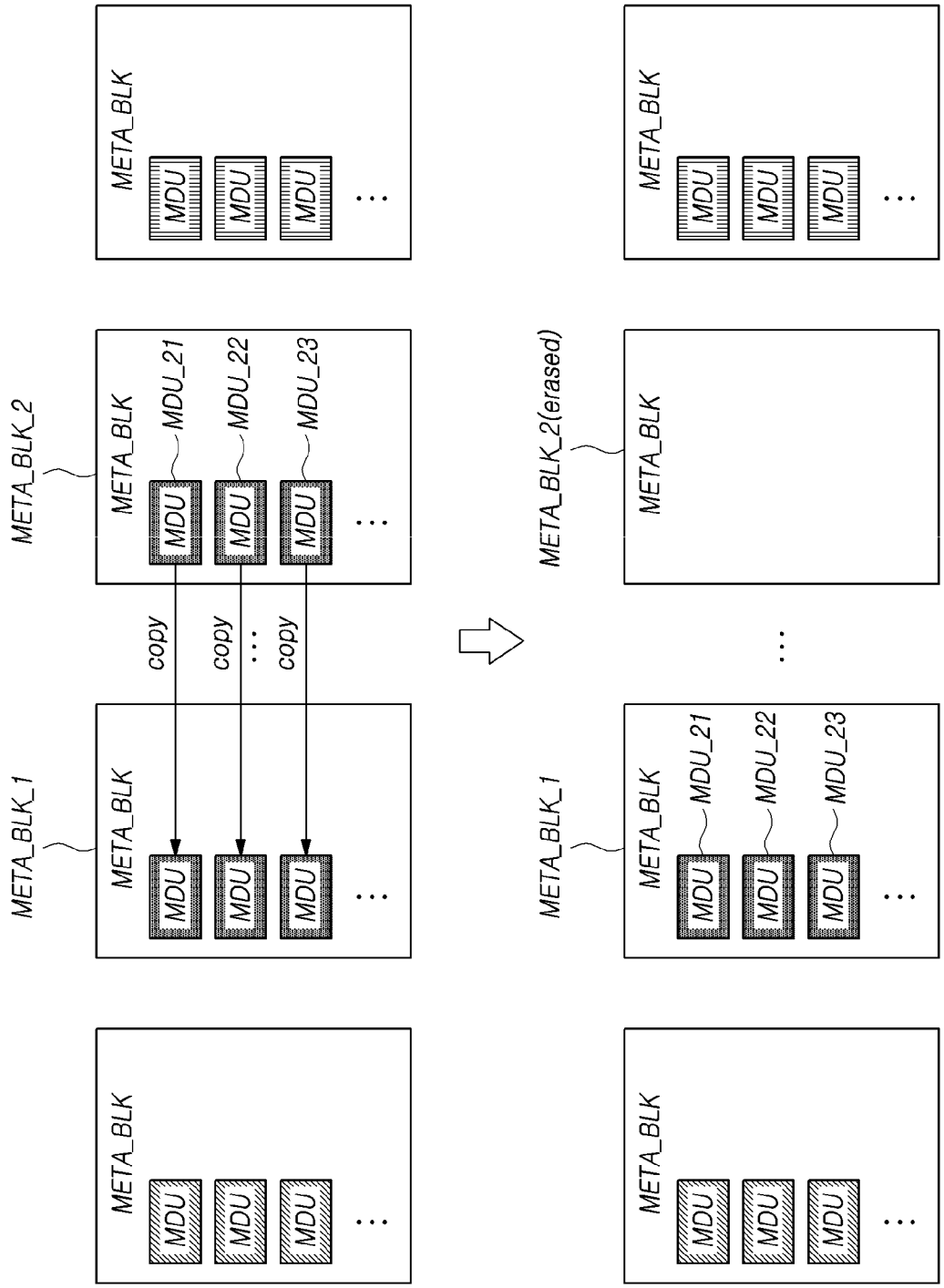

FIGS. 5 and 6 illustrate an operation of managing a plurality of metadata memory blocks META_BLK according to an embodiment of the disclosed technology. The operation may be performed by the controller 120 of the storage device 100 shown in FIG. 3.

Referring to FIG. 5, a plurality of metadata units MDU are stored in each of the plurality of metadata memory blocks META_BLK.

The controller 120 of the storage device 100 may execute an erase operation on a first metadata memory block META_BLK_1 among the plurality of metadata memory blocks META_BLK. That is to say, the first metadata memory block META_BLK_1 is a target metadata memory block on which the erase operation is to be executed among the plurality of metadata memory blocks META_BLK.

The first metadata memory block META_BLK_1 may be determined as the target metadata memory block in various ways.

For example, the controller 120 may determine, as the target metadata memory block, the first metadata memory block META_BLK_1 among the plurality of metadata memory blocks META_BLK in a round-robin manner. The controller 120 may erase the plurality of metadata memory blocks META_BLK one by one according to a preset sequence.

For another example, the controller 120 may determine, as the target metadata memory block, a metadata memory block META_BLK whose erase time point is oldest among the plurality of metadata memory blocks META_BLK.

For still another example, the controller 120 may determine, as the target metadata memory block, a metadata memory block META_BLK whose time point at which a metadata unit MDU is lastly written is oldest among the plurality of metadata memory blocks META_BLK.

When the erase operation is executed on the first metadata memory block META_BLK_1, metadata units MDU_11, MDU_12, MDU_13, . . . stored in the first metadata memory block META_BLK_1 are deleted. When a backup operation is not performed on the metadata units MDU_11, MDU_12, MDU_13, . . . previously stored in the first metadata memory block META_BLK_1, the metadata units MDU_11, MDU_12, MDU_13, . . . previously stored in the first metadata memory block META_BLK_1 no longer exist in the plurality of metadata memory blocks META_BLK.

Referring to FIG. 6, the controller 120 of the storage device 100 may determine a second metadata memory block META_BLK_2, among the plurality of metadata memory blocks META_BLK, as the target metadata memory block on which the erase operation is to be executed next to the first metadata memory block META_BLK_1.

The second metadata memory block META_BLK_2 may be determined as the target metadata memory block in the same manner as determining the first metadata memory block META_BLK_1 as the target metadata memory block.

Before performing the erase operation on the second metadata memory block META_BLK_2, the controller 120 may copy all or some of metadata units MDU_21, MDU_22, MDU_23, . . . stored in the second metadata memory block META_BLK_2 to the first metadata memory block META_BLK_1. Since the erase operation on the first metadata memory block META_BLK_1 has previously been executed as described with reference to FIG. 5, the first metadata memory block META_BLK_1 has a free space capable of storing the metadata units MDU_21, MDU_22, MDU_23, . . . .

Thereafter, the controller 120 may execute the erase operation on the second metadata memory block META_BLK_2. In this case, since the metadata units MDU_21, MDU_22, MDU_23, . . . previously stored in the second metadata memory block META_BLK_2 are copied to the first metadata memory block META_BLK_1, the metadata units MDU_21, MDU_22, MDU_23, . . . are not lost even though the second metadata memory block META_BLK_2 is erased.

Through this, the controller 120 may retain metadata units MDU having high importance, among metadata units MDU stored in the plurality of metadata memory blocks META_BLK, as long as possible in the plurality of metadata memory blocks META_BLK.

The longer metadata units MDU having high importance are retained, the higher the possibility of performing maintenance on data stored in the storage device 100 using the metadata units MDU having high importance in the future is. Accordingly, it is possible to secure high reliability of data stored in the storage device 100.

Hereinafter, which metadata units MDU among the metadata units MDU_21, MDU_22, MDU_23, . . . stored in the second metadata memory block META_BLK_2 are to be copied to the first metadata memory block META_BLK_1 will be described.

For example, the controller 120 may copy only valid metadata units MDU, among the metadata units MDU_21, MDU_22, MDU_23, . . . stored in the second metadata memory block META_BLK_2, to the first metadata memory block META_BLK_1.

For another example, the controller 120 may copy some of the metadata units MDU_21, MDU_22, MDU_23, . . . stored in the second metadata memory block META_BLK_2 to the first metadata memory block META_BLK_1 according to priorities of the metadata units MDU_21, MDU_22, MDU_23, . . . .

Figure 7:
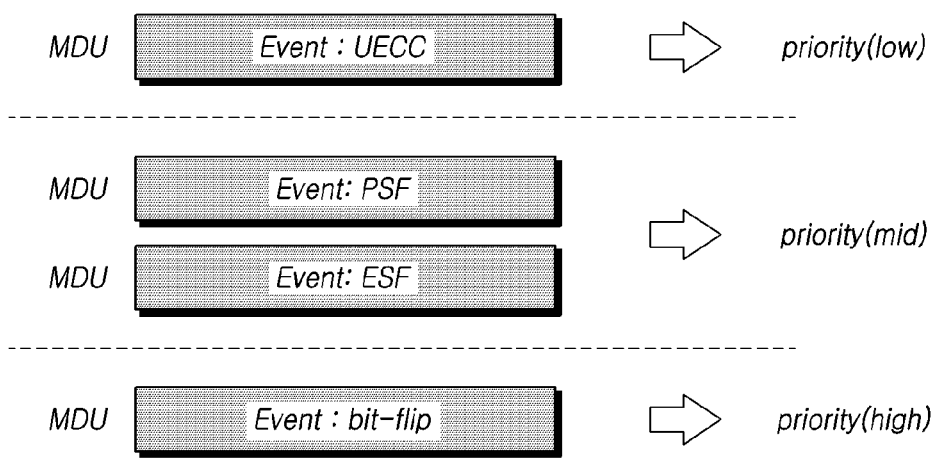
FIG. 7 illustrates priorities of metadata units according to an embodiment of the disclosed technology.

FIG. 7 illustrates priorities of metadata units MDU according to an embodiment of the disclosed technology.

Each metadata unit MDU may have a priority corresponding to an event indicated thereby.

For example, as shown in FIG. 7, a metadata unit MDU indicating that an uncorrectable ECC (UECC) has occurred may have a low-priority. A metadata unit MDU indicating that a program status fail (PSF) has occurred and a metadata unit MDU indicating that an erase status fail (ESF) has occurred may have a mid-priority. A metadata unit MDU indicating that a bit-flip has occurred may have a high-priority.

Priorities of metadata units MDU are not limited to the priorities shown in FIG. 7. For example, besides the three priorities (the high-priority, the mid-priority, and the low-priority) described above with reference to FIG. 7, additional priorities may exist.

In an embodiment of the disclosed technology, the controller 120 of the storage device 100 may use the priorities of the metadata units MDU in determining metadata units MDU to be copied from the second metadata memory block META_BLK_2 to the first metadata memory block META_BLK_1.

In other words, when copying metadata units MDU from the second metadata memory block META_BLK_2 to the first metadata memory block META_BLK_1, the controller 120 of the storage device 100 may determine the metadata units MDU to be copied based on priorities of the metadata units MDU stored in the second metadata memory block META_BLK_2.

Hereinafter, determining the priority of each of metadata units MDU will be described.

For example, the controller 120 of the storage device 100 may determine the priority of each of the metadata units MDU based on a trigger event of the metadata unit MDU.

The trigger event indicated by the metadata unit MDU is an event of triggering an operation of storing the metadata unit MDU in one of the plurality of metadata memory blocks META_BLK, among one or more events indicated by the metadata unit MDU. Namely, when the trigger event occurs, the metadata unit MDU may be stored in one of the plurality of metadata memory blocks META_BLK.

In an embodiment of the disclosed technology, the priority of each of the metadata units MDU may be determined based on at least one of 1) a frequency of occurrence of a trigger event indicated by each of the metadata units MDU and 2) a recovery probability of the trigger event indicated by each of the metadata units MDU. The recovery probability of the trigger event may be defined as probability that an error occurred in the trigger event is correctable or probability of correcting an error occurred in the trigger event using a preset amount of time and resources.

Hereinafter, determining the priority of the metadata unit MDU will be described in detail with reference to FIGS. 8 and 9.

Figure 8:
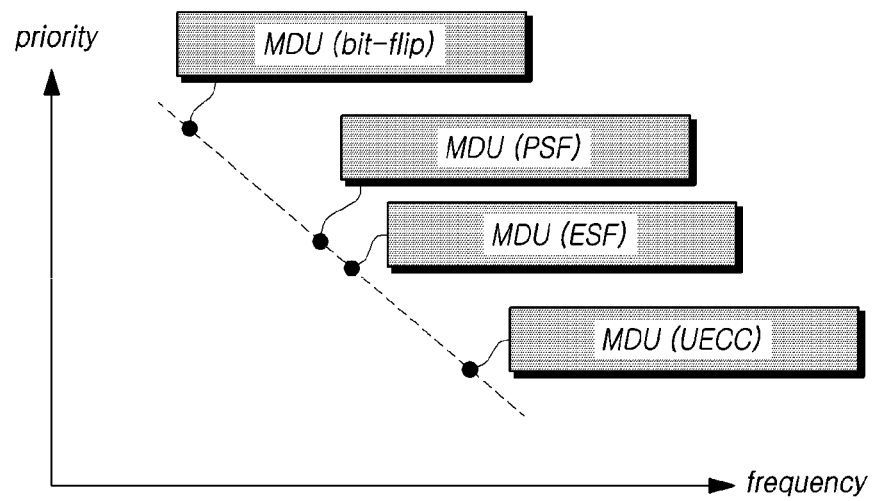
FIG. 8 illustrates priorities of metadata units according to an embodiment of the disclosed technology.

FIG. 8 illustrates priorities of metadata units MDU according to an embodiment of the disclosed technology.

Referring to FIG. 8, the priorities of the metadata units MDU may be inversely proportional to the frequencies of occurrence of trigger events indicated by the metadata units MDU. That is to say, a priority of a metadata unit MDU indicating a trigger event whose frequency of occurrence is higher is lower than a priority of a metadata unit MDU indicating a trigger event whose frequency of occurrence is lower. This is because an event with a low frequency of occurrence is more likely to exert a great influence on the storage device 100.

In FIG. 8, a priority of a metadata unit MDU corresponding to a bit-flip event with the lowest frequency of occurrence is highest.

A priority of a metadata unit MDU corresponding to a program status fail (PSF) event with a higher frequency of occurrence than the bit-flip event is lower than the priority of the metadata unit MDU corresponding to the bit-flip event.

A priority of a metadata unit MDU corresponding to an erase status fail (ESF) event with a higher frequency of occurrence than the program status fail (PSF) event is lower than the priority of the metadata unit MDU corresponding to the program status fail (PSF) event.

Lastly, a priority of a metadata unit MDU corresponding to an uncorrectable ECC (UECC) event with a higher frequency of occurrence than the erase status fail (ESF) event is lower than the priority of the metadata unit MDU corresponding to the erase status fail (ESF) event.

Figure 9:
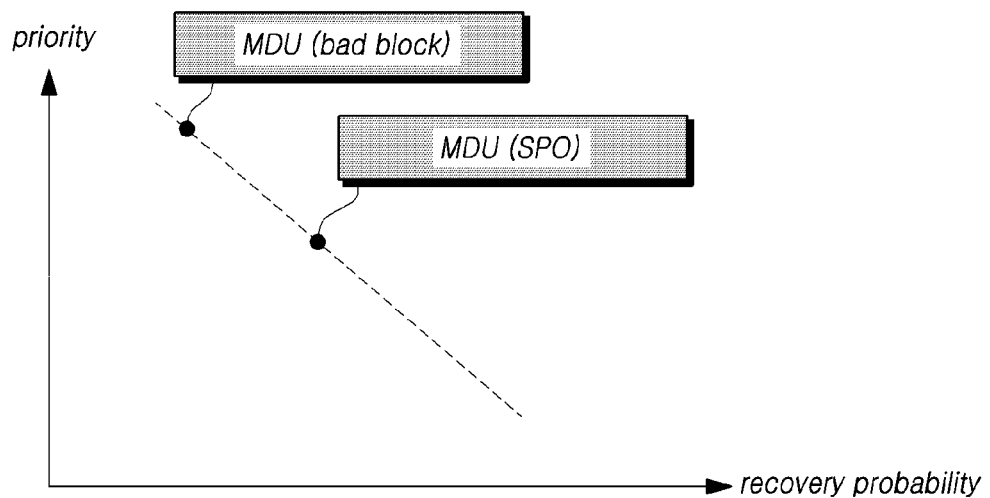
FIG. 9 illustrates priorities of metadata units according to another embodiment of the disclosed technology.

FIG. 9 illustrates priorities of metadata units according to another embodiment of the disclosed technology.

Referring to FIG. 9, the priorities of the metadata units MDU may be inversely proportional to recovery probabilities of trigger events indicated by the metadata units MDU. That is to say, a priority of a metadata unit MDU indicating a trigger event whose recovery probability is higher is lower than a priority of a metadata unit MDU indicating a trigger event whose recovery probability is lower. This is because an event with a low recovery probability is more likely to exert a great influence on the storage device 100, and a recovery operation for the corresponding event is more likely to take a long time.

In FIG. 9, a priority of a metadata unit MDU corresponding to a sudden power-off (SPO) event with a higher recovery probability than a bad block event is lower than a priority of a metadata unit MDU corresponding to the bad block event.

Meanwhile, priorities of metadata units MDU indicating trigger events with the same frequency of occurrence may be determined according to the recovery probabilities of the trigger events indicated by the metadata units MDU.

Hereinafter, an operation in which the storage device 100 copies metadata units MDU from the second metadata memory block META_BLK_2 to the first metadata memory block META_BLK_1 based on priorities of the metadata units MDU will be described with reference to FIGS. 10 to 12.

Hereinafter, a case where a priority of each of metadata units MDU is a high-priority, a mid-priority, or a low-priority will be described as an example.

Figure 10:
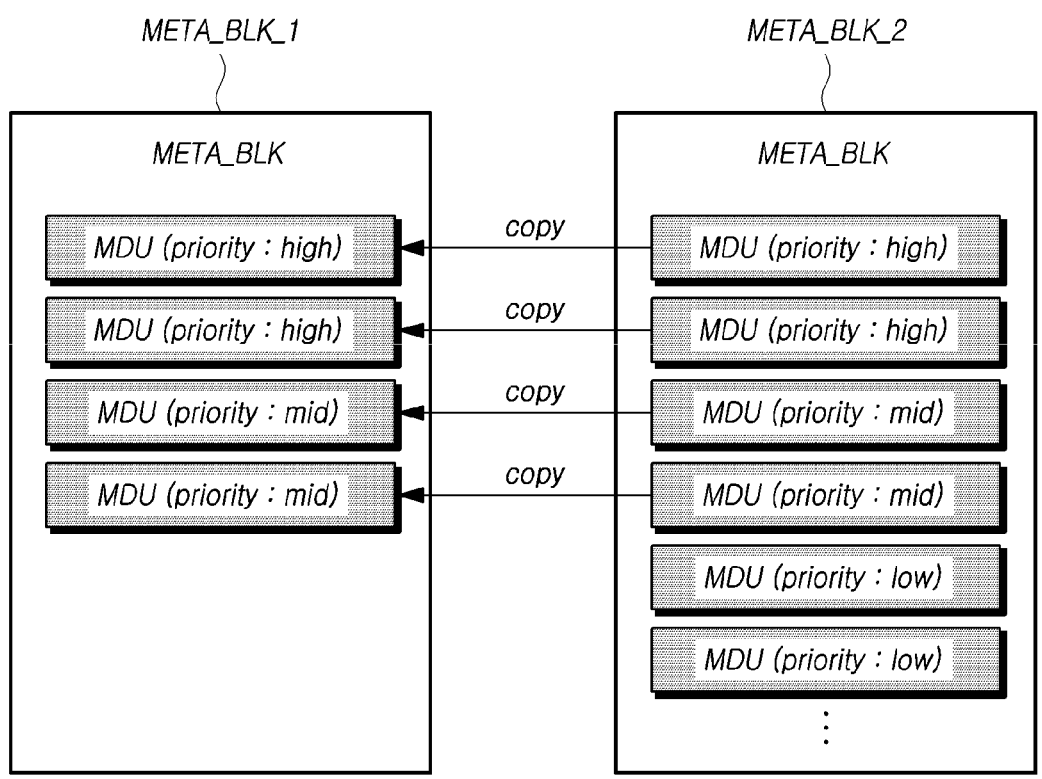
FIG. 10 illustrates an operation of copying metadata units stored in a second metadata memory block to a first metadata memory block according to an embodiment of the disclosed technology.

FIG. 10 illustrates an operation of copying the metadata units MDU stored in the second metadata memory block META_BLK_2 to the first metadata memory block META_BLK_1 according to an embodiment of the disclosed technology.

The controller 120 of the storage device 100 may copy metadata units MDU whose priorities are equal to or higher than a threshold priority THR_PRIORITY, among the metadata units MDU stored in the second metadata memory block META_BLK_2, to the first metadata memory block META_BLK_1.

In FIG. 10, the threshold priority THR_PRIORITY is a mid-priority. Accordingly, the controller 120 may copy metadata units MDU with a high-priority or a mid-priority to the first metadata memory block META_BLK_1.

On the other hand, metadata units MDU with a low-priority are not copied to the first metadata memory block META_BLK_1. Therefore, when the second metadata memory block META_BLK_2 is erased, the metadata units MDU with the low-priority are deleted and thus no longer exist in the plurality of metadata memory blocks META_BLK.

On the other hand, the metadata units MDU with the high-priority or the mid-priority may be copied and retained in the first metadata memory block META_BLK_1. Through this, the controller 120 of the storage device 100 may retain metadata units MDU with a higher priority in the plurality of metadata memory blocks META_BLK for a longer time.

Figure 11:
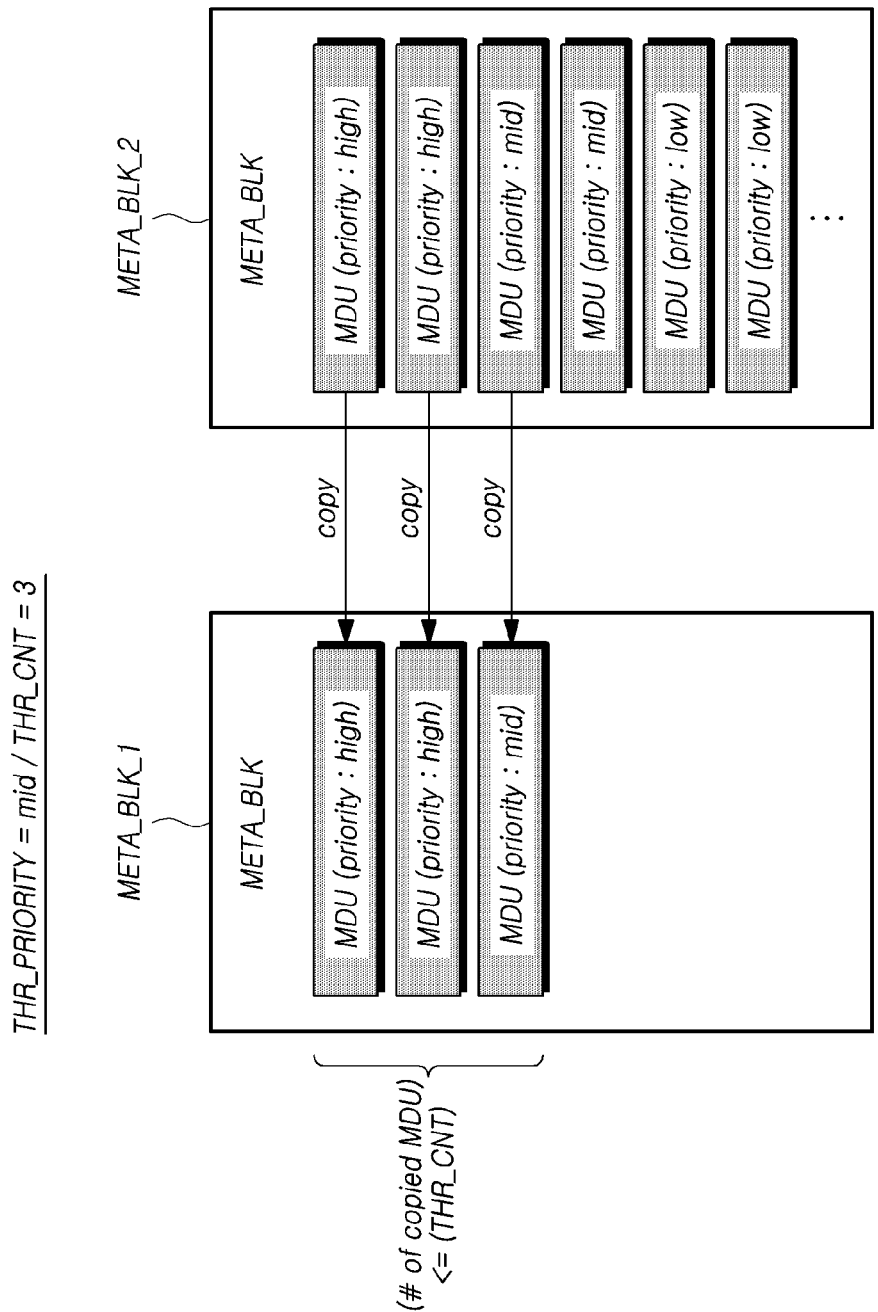
FIG. 11 illustrates an operation of copying metadata units stored in a second metadata memory block to a first metadata memory block according to another embodiment of the disclosed technology.

FIG. 11 illustrates an operation of copying the metadata units MDU stored in the second metadata memory block META_BLK_2 to the first metadata memory block META_BLK_1 according to another embodiment of the disclosed technology.

The controller 120 of the storage device 100 may copy a given number of metadata units MDU from the second metadata memory block META_BLK_2 to the first metadata memory block META_BLK_1. The given number may be equal to or less than a threshold copy count THR_CNT.

In FIG. 11, the threshold copy count THR_CNT is 3. Accordingly, the controller 120 of the storage device 100 may copy maximum three metadata units MDU from the second metadata memory block META_BLK_2 to the first metadata memory block META_BLK_1.

In this case, the controller 120 may copy two metadata units MDU with a high-priority from the second metadata memory block META_BLK_2 to the first metadata memory block META_BLK_1.

In addition, the controller 120 may copy only one of two metadata units MDU with a mid-priority from the second metadata memory block META_BLK_2 to the first metadata memory block META_BLK_1.

This is because, if both of the two metadata units MDU with the mid-priority are copied from the second metadata memory block META_BLK_2 to the first metadata memory block META_BLK_1, the number of metadata units MDU copied from the second metadata memory block META_BLK_2 to the first metadata memory block META_BLK_1 exceeds the threshold copy count THR_CNT.

Figure 12:
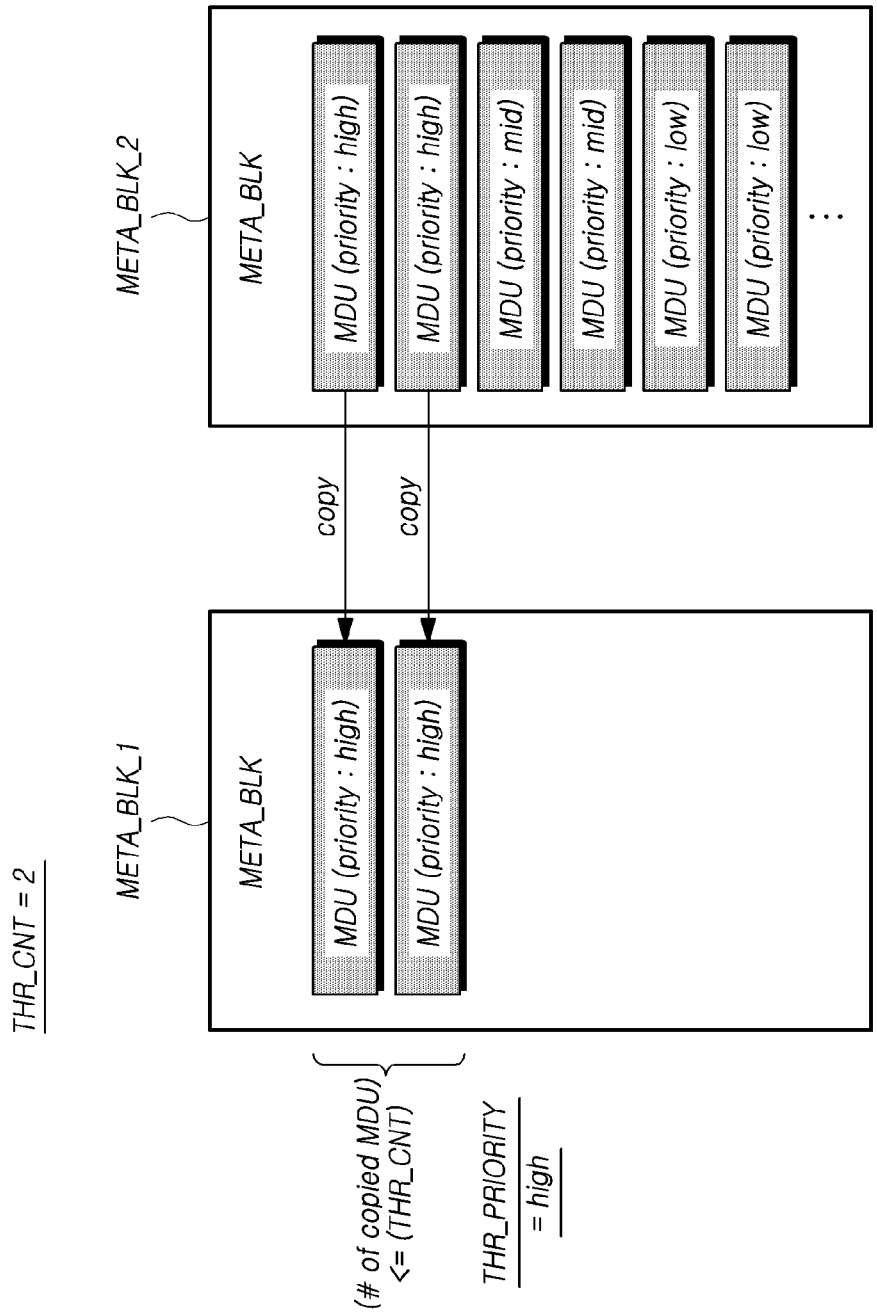
FIG. 12 illustrates an operation of copying metadata units stored in a second metadata memory block to a first metadata memory block according to still another embodiment of the disclosed technology.

FIG. 12 illustrates an operation of copying the metadata units MDU stored in the second metadata memory block META_BLK_2 to the first metadata memory block META_BLK_1 according to still another embodiment of the disclosed technology.

The controller 120 of the storage device 100 may change the threshold priority THR_PRIORITY such that the number of metadata units MDU to be copied to the first metadata memory block META_BLK_1 among the metadata units MDU stored in the second metadata memory block META_BLK_2 is equal to or less than the threshold copy count THR_CNT.

In FIG. 12, the threshold copy count THR_CNT is 2. Therefore, the controller 120 may change the threshold priority THR_PRIORITY from a mid-priority to a high-priority such that the number of metadata units MDU to be copied to the first metadata memory block META_BLK_1 among the metadata units MDU stored in the second metadata memory block META_BLK_2 is equal to or less than 2.

Figure 13:
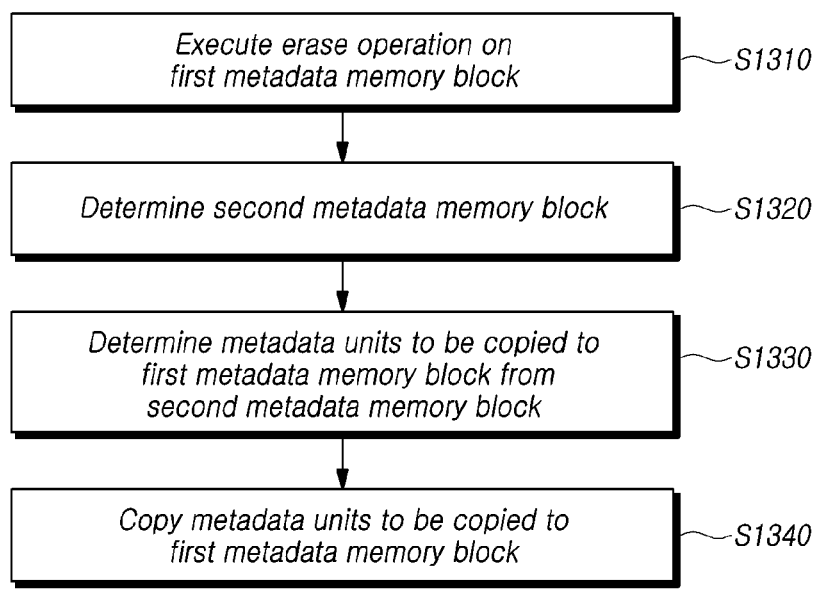
FIG. 13 illustrates a method of operating a storage device according to an embodiment of the disclosed technology.

FIG. 13 illustrates a method of operating a storage device according to an embodiment of the disclosed technology.

Referring to FIG. 13, the method may include executing an erase operation on a first metadata memory block META_BLK_1 among a plurality of metadata memory blocks META_BLK included in the storage device (S1310). Each of the plurality of metadata memory blocks META_BLK may store a plurality of metadata units MDU.

For example, each of the plurality of metadata units MDU may include information indicating at least one event occurred in the storage device.

The method may include determining a second metadata memory block META_BLK_2 among the plurality of metadata memory blocks META_BLK (S1320). The second metadata memory block META_BLK_2 is a metadata memory block on which the erase operation is to be executed next to the first metadata memory block META_BLK_1 among the plurality of metadata memory blocks META_BLK.

The method may include determining metadata units MDU to be copied to the first metadata memory block META_BLK_1 among metadata units MDU stored in the second metadata memory block META_BLK_2 (S1330).

For example, in step S1330, the metadata units MDU to be copied from the second metadata memory block META_BLK_2 to the first metadata memory block META_BLK_1 may be determined based on priorities of the metadata units MDU stored in the second metadata memory block META_BLK_2.

The priorities of the metadata units MDU stored in the second metadata memory block META_BLK_2 may be determined based on trigger events of the metadata units MDU stored in the second metadata memory block META_BLK_2. A trigger event of each of the metadata units MDU stored in the second metadata memory block META_BLK_2 may be an event that triggers an operation of storing the metadata unit MDU in one of the plurality of metadata memory blocks META_BLK.

For example, the priority of each of the metadata units MDU stored in the second metadata memory block META_BLK_2 may be determined based on at least one of i) the frequency of occurrence of the trigger event indicated by the metadata unit and ii) the recovery probability of the trigger event indicated by the metadata unit MDU.

For example, in step S1330, metadata units MDU whose priorities are equal to or higher than a threshold priority THR_PRIORITY are determined as the metadata units MDU to be copied to the first metadata memory block META_BLK_1.

The number of metadata units MDU to be copied from the second metadata memory block META_BLK_2 to the first metadata memory block META_BLK_1 may be equal to or less than a threshold copy count THR_CNT.

To this end, in step S1330, the threshold priority THR_PRIORITY may be changed such that the number of metadata units MDU to be copied to the first metadata memory block META_BLK_1 is equal to or less than the threshold copy count THR_CNT.

The method may include copying the metadata units MDU determined in step S1330 to the first metadata memory block META_BLK_1 (S1340).

Although the embodiments of the present disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A storage device comprising:
    a memory including a plurality of metadata memory blocks, each metadata memory block storing a plurality of metadata units; and
    a controller configured to execute an erase operation on a first metadata memory block, and copy, to the first metadata memory block, all or some of metadata units stored in a second metadata memory block that is a metadata memory block on which the erase operation is to be executed after the erase operation is executed on the first metadata memory block, the first and the second metadata memory blocks being included in the plurality of metadata memory blocks,
    wherein each of the plurality of metadata units includes information indicating at least one event occurred in the storage device,
    wherein the controller determines metadata units to be copied from the second metadata memory block to the first metadata memory block based on priorities of the metadata units stored in the second metadata memory block, wherein a priority of each of the plurality of metadata units corresponds to the event indicated by the information included in each metadata unit, wherein the controller determines a priority of each of the metadata units stored in the second metadata memory block based on a trigger event of each of the metadata units stored in the second metadata memory block, and the trigger event of each of the metadata units is an event that triggers an operation of storing each metadata unit in one of the plurality of metadata memory blocks, wherein the controller determines the priority of each of the metadata units stored in the second metadata memory block based on at least one of a frequency of occurrence of the trigger event and a recovery probability of the trigger event, and wherein the controller copies all or some of metadata units whose priorities are equal to or higher than a threshold priority, among the metadata units stored in the second metadata memory block, to the first metadata memory block.

2. The storage device according to claim 1, wherein the controller copies a given number of metadata units, among the metadata units stored in the second metadata memory block, to the first metadata memory block, the given number being equal to or less than a threshold value.

3. The storage device according to claim 2, wherein the controller changes the threshold priority such that the given number is equal to or less than the threshold value.

4. A method of operating a storage device, the method comprising:

executing an erase operation on a first metadata memory block among a plurality of metadata memory blocks each capable of storing a plurality of metadata units;

determining a second metadata memory block on which the erase operation is to be executed after the erase operation is executed on the first metadata memory block;

determining target metadata units to be copied to the first metadata memory block among metadata units stored in the second metadata memory block; and copying the target metadata units to the first metadata memory block, wherein each of the plurality of metadata units includes information indicating at least one event occurred in the storage device, wherein the determining of the target metadata units includes determining the target metadata units based on priorities of the metadata units stored in the second metadata memory block, wherein a priority of each of the plurality of metadata units corresponds to the event indicated by the information included in each metadata unit, wherein the priority of each of the metadata units stored in the second metadata memory block is determined based on a trigger event of each of the metadata units stored in the second metadata memory block, and the trigger event of each of the metadata units stored in the second metadata memory block is an event that triggers an operation of storing each metadata unit in one of the plurality of metadata memory blocks, wherein the priority of each of the metadata units stored in the second metadata memory block is determined based on at least one of a frequency of occurrence of the trigger event and a recovery probability of the trigger event, and wherein the determining of the target metadata units includes determining, as the target metadata units, all or some of metadata units whose priorities are equal to or higher than a threshold priority among the metadata units stored in the second metadata memory block.

5. The method according to claim 4, wherein a number of the target metadata units is determined to be equal to or less than a threshold value.

6. The method according to claim 5, wherein the determining of the target metadata units includes changing the threshold priority such that the number of the target metadata units is equal to or less than the threshold value.

7. A controller, comprising:

a memory interface capable of communicating with a memory that includes a plurality of metadata memory blocks each capable of storing a plurality of metadata units; and a control circuit configured to copy target metadata units stored in a first metadata memory block on which an erase operation is to be executed among the plurality of metadata memory blocks, to a second metadata memory block in which a free space exists, the first and the second metadata memory blocks being included in the plurality of metadata memory blocks, wherein each of the plurality of metadata units includes information indicating at least one event occurred in a storage device including the controller, wherein the control circuit determines metadata units to be copied from the second metadata memory block to the first metadata memory block based on priorities of the metadata units stored in the second metadata memory block, wherein a priority of each of the plurality of metadata units corresponds to the event indicated by the information included in each metadata unit, wherein the control circuit determines a priority of each of the metadata units stored in the second metadata memory block based on a trigger event of each of the metadata units stored in the second metadata memory block, and the trigger event of each of the metadata units is an event that triggers an operation of storing each metadata unit in one of the plurality of metadata memory blocks, wherein the control circuit determines the priority of each of the metadata units stored in the second metadata memory block based on at least one of a frequency of occurrence of the trigger event and a recovery probability of the trigger event, and wherein the control circuit copies all or some of metadata units whose priorities are equal to or higher than a threshold priority, among the metadata units stored in the second metadata memory block, to the first metadata memory block.

* * * * *